United States Patent Office 3,619,894
Patented Nov. 16, 1971

3,619,894
PROCESS FOR THE PRODUCTION OF A COMPOSITE MATERIAL Al-Mg-Al$_2$O$_3$-MgO
Dante Gualandi, Arona, and Pierre Jehenson, Varese, Italy, assignors to European Atomic Energy Community (Euratom), Brussels, Belgium
No Drawing. Filed Aug. 6, 1968, Ser. No. 750,462
Claims priority, application Italy, Aug. 31, 1967, 39,127/67
Int. Cl. B22f 3/24
U.S. Cl. 29—420.5                    2 Claims

ABSTRACT OF THE DISCLOSURE

A method for producing sintered composite

Al-Mg-Al$_2$O$_3$-MgO material for nuclear applications, comprising grinding an Al-Mg alloy powder in air using an aluminum mill and a grinding lubricant, cold compressing the ground powder, effecting a controlled oxidation to form a double oxide Al$_2$O$_3$-MgO product; sintering and degasifying the product, hot compressing and then extruding the product.

---

The invention relates to a composite material

Al-Mg-Al$_2$O$_3$-MgO and to a method of manufacturing such a material and products therefrom, more particularly nuclear fuel element cans or nuclear reactor pressure tubes. The invention relates more particularly to a method of obtaining sintered products adapted to these nuclear applications and having highly uniformly distributed Al$_2$O$_3$ and MgO. Nuclear reactor pressure tubes for fuel element cans made of sintered Al-Al$_2$O$_3$, referred to hereinafter as finished products, when produced by the prior art manufacturing methods have hot characteristics at the temperature of use (300–500° C. in some nuclear reactors) which are still too limited to guarantee satisfactory and widescale use of such finished products in nuclear reactors, due to the heavy loading conditions in the reactor and the period during which the products are used therein.

The temperature of a fuel element can containing the fuel element and externally in contact with a flow of coolant must of course be high to obtain the best results, for instance, in the case of fuel formed by briquettes or lozenges of uranium carbide, the temperature on the axis can be above 1000° C., and the coolant can reach temperatures of the order of 400–450° C., while the can temperature can reach up to 400–450° C. with places as high as 500° C.

The conditions of use of the reactor are also such as to demand that fuel element cans must have a strength of long duration even in their hottest and most heavily stressed zones, and in the zones which are weakened by the welds, for instance, at the ends of the can.

To increase the mechanical strength and ductility of the composite material with dispersed phases, forming a nuclear fuel element can or a reactor pressure tube, the material must have the maximum homogeneity of manufacture, the highest purity, and considerable homogeneity of distribution of the oxides subdivided into fine particles in the matrix.

A method of manufacturing sintered products, referred to hereinafter as semi-finished products, for the industrial manufacture of finished products of the kind set forth hereinbefore, is described in Italian Pat. No. 665,-857 filed on May 17, 1963, and Italian Pat. No. 700,833 filed on Mar. 30, 1965 (British Pat. application No. 13,617/66) in the name of the applicant for: "Method of Producing High Purity Sintered Al-Al$_2$O$_3$ for Nuclear Applications" and "Products of the Composite Material Al-Al$_2$O$_3$ for Nuclear Applications and Method for Obtaining the Products."

The method set forth in Pat. No. 665,857, which starts from a 99.99% super-purity aluminium, comprises a powdering phase by atomisation in the molten state or pulverisation by a gun from a metal wire; a controlled oxidation phase of the powder obtained by grinding in containers made of aluminium or its alloys by means of grinding agents also made of aluminium or its alloys; and finally, a sintering phase of the oxidised powders. The sintered products thus obtained are converted by conventional manufacturing methods into the finished products available in commerce under the name Puroxal (a trademark registered in Italy), by which they will be referred to hereinafter.

Despite the high final purity which can be obtained by the prior art method set forth hereinbefore, Puroxal products still have some anisotropy in the properties of the material of which they are made, and this limits their strength and ductility under the conditions of utilisation in a nuclear reactor.

The second Pat. No. 700,833 filed on Mar. 30, 1965 (British application No. 13,617/66) related to the obtaining of finished products having the highest purity characteristics, strength and ductility, by a method which is similar to that as set forth in the first-mentioned patent and which allows a control and a gradation of oxidation so as to obtain a more satisfactory and regular distribution of the aluminium oxide, and a reduction in the particle sizes of the oxide.

Although these measures improve the aforementioned characteristics, it is desirable further to improve hot ductility, more particularly creep. It has been found that this aim can be achieved by substituting for the composite material Al-Al$_2$O$_3$ the composite material Al-Mg-Al$_2$O$_3$-MgO produced by using a method of manufacture similar to that disclosed in Pat. No. 700,833 (British application No. 13,617/66). With this new composite material and method the oxidation can readily be graded and controlled so as to obtain a very satisfactory and regular distribution of the double oxide Al$_2$O$_3$-MgO. It has been found that the use of hardened alloy of Al—i.e., for instance, a super-purity Al-Mg alloy (2–5% Mg by weight)—instead of super-purity aluminium as the starting material improves the characteristics of the finished product.

In its broad form the invention provides a process for the production of a composite material Al-Mg-Al$_2$O$_3$-MgO which comprises the steps of forming a powder of Al-Mg alloy, grinding the powder in the presence of oxygen whereby partial oxidation to Al$_2$O$_3$ and MgO is effected and then heating the powder to form dispersed therein a double oxide Al$_2$O$_3$-MgO.

The invention further provides a process for manufacturing tubular products from the composite material Al-Mg-Al$_2$O$_3$-MgO for example for nuclear applications, such as nuclear fuel element cans or nuclear reactor pressure tubes, the process comprising a metallurgical process for obtaining sintered Al-Mg-Al$_2$O$_3$-MgO products having a controlled Al$_2$O$_3$ content, lying between 2 and 20% by weight, and a controlled MgO content, lying between 1 and 10% by weight, characterised in that the process comprises: a powdering phase, using as the starting material Al-Mg (2–5% Mg by weight) (preferably 99.99% super-purity Al or 99.9% pure aluminium), in which the starting material is reduced to a powder in which any impurity is present in a quantity lower than 0.1% by weight, by atomisation from the molten state or pulverisation by a gun from a wire of the alloy, the powder being collected in sedimentation or filtering chambers, or in cyclones made of aluminium and its alloys; a controlled oxidation phase of a fraction of given grain size of the powder obtained, in which grinding is performed in air at ambient temperature in a mill comprising grinding containers and grinding agents made of aluminium alloy (for instance, Al-Mg), until the required $Al_2O_3$ content of between 2 and 20% is obtained, the grinding agent being either stearic acid, a stearate or, preferably, a silicone; a cold compression phase of the powders with the required oxide content, preferably performed at a pressure of the order of 2 t./cm.$^2$; a transformation phase of the oxides stabilisation, sintering and hot degasification performed at a temperature of 550–625° C. in a furnace in vacuo at a residual pressure of $10^{-2}$–$10^{-5}$ mm. Hg for a period of about 10–30 hours, preferably 20–24 hours; a hot compression phase, preferably performed at a temperature of 600° C. and a pressure of the order of 5 t./cm.$^2$; and at least one extrusion operation of the sintered products obtained, followed by a drawing operation.

Bore specifically the main features of the process are as follows:

(1) The use of a super-purity Al-Mg alloy (for instance 2–5% Mg by weight) (99.99% basic Al, for instance "Raffinal," trademark);

(2) The atomisation of the Al-Mg alloy under special conditions to ensure the absence of contaminations, for instance, by atomisation of the molten alloy, or by pulverisation from a wire in suitable conditions (for instance, by spraying on to a rotating disc or cylinder to obtain flattened particles);

(3) The controlled oxidation by grinding in the presence of oxygen of the powder obtained, in receptacles made of aluminium alloy (Al-Mg), with a grinding agent made of aluminium alloy (Al-Mg) or ceramics materials, until the required level of $Al_2O_3$ is reached, being preferably 2–20% $Al_2O_3$. The use in this phase of a silicone as a grinding agent, instead of those conventionally used such as stearic acid or stearates, is preferable (cf. Italian Pat. No. 700,833), and influences the regularity of the oxidation, enabling the powders of Al-Mg alloys to be more uniformly ground and the oxidation speed to be more satisfactorily controlled;

(4) A stabilisation or sintering stage at elevated temperature in vacuo.

During the important stage—i.e., the controlled oxidation phase or the powder by grinding, using as the grinding agent stearic acid, stearate or preferably a silicone— the oxygen acts on the aluminium to produce $Al_2O_3$, and on the Mg to give MgO.

During the stage of transformation of the oxides (stabilisation-sintering), which stage becomes the fundamental phase of the instant method, the Mg of the matrix reacts with $Al_2O_3$, and instead of the simple, fine and well dispersed $Al_2O_3$, a double oxide $Al_2O_3$-MgO (spinel or mixed oxide) is surprisingly formed, the double oxide being therefore formed in situ, satisfactorily stabilised and, due to the very fine initial dispersion of the $Al_2O_3$, also very finely dispersed in the matrix of Al-Mg alloy.

These features of the method, and particularly the production of the very fine and homogeneous dispersion of the created spinel, produce high temperature strength and ductility properties which are even more advantageous than those adopted by the method set forth in Italian Pat. 700,833, as will be seen from a comparison of the results given at the end of the present description.

In detail, the method according to the invention mainly comprises the following operations:

Phase a.—Using as the starting material Al-Mg (for instance, 2–5% Mg by weight), the alloy being obtained from a 99.99% super-purity aluminium or a 99.9% pure aluminium, the alloy is reduced to powder in which the amount of any impurity present is kept as low as possible, for instance, less than 0.005% by weight, by atomisation in the molten state or pulverisation with a gun from a metal wire, the resulting powder then being collected in sedimentation or filter chambers or in cyclones, made of aluminium or its alloys;

Phase b.—The resulting powder is classified, and the controlled oxidation of the fractions of a selected grain size is performed until the required $Al_2O_3$ content of 2–20% is obtained, by grinding in mills comprising containers made of aluminium or its alloys and grinding agents also made of aluminium or its alloy (for instance, ball mills made of Al-Mg alloys with balls made of Al-Mg alloy) to avoid contamination of the material of which the mill is made, stearic acid, stearate or preferably silicone, preferably a silicone grease, being used as the grinding lubricant and binder, grinding being performed in air and at ambient temperature with control of the air impoverished in oxygen (oxygen content and humidity) and of the temperature constancy.

Phase c.—The resulting powders, preferably having an aluminium oxide content of 2–20%—are then subjected to a cold compression phase, preferably performed at a pressure of the order of 2 t./cm.$^2$.

Phase d.—Sintering is performed to form a double oxide $Al_2O_3$-MgO, and the double oxide is stabilized and degasified hot at a temperature of 550–625° C. in a furnace in vacuo with a residual pressure of $10^{-2}$–$10^{-5}$ mm. Hg for a period of the order of 10–30 hours, preferably 20–24 hours. Another Italian patent (No. 639,356 of May 30, 1961) (British Pat. No. 981,874) discloses a degasification process which is similar, but is performed in a more restricted temperature interval of 550–660° C.

Phase e.—The material is given a hot compressing, preferably performed at a temperature of 600° C. and a pressure of the order of 5–6 t./cm.$^2$.

The resulting products are then transferred into tubes by at least one extrusion operation if necessary followed by a drawing operation performed by any known method.

The use of silicone in the grinding phase enables a very fine homogeneous distribution to be obtained in the final product of the fine particles of the double oxide of aluminium and magnesium in the matrix of the Al-Mg alloy. This means that after stabilization and sintering, the same fine, homogeneous distribution of the particles of the double oxide $Al_2O_3$-MgO can be obtained in the matrix of the Al-Mg alloy, so that more resistant products, in particular tubes, can be obtained, and the material is free from fragments of oxide in a rough, heterogeneous form.

The high purity conferred on the products produced by the method according to the invention, and the controlled oxidation has an influence on their characteristics and facilitates their manufacture.

The use of the products for nuclear applications, more particularly, tubes to be used as fuel element cans, the tubes being either smooth or having longitudinal or helical cooling fins, or pressure tubes with large internal diameters, results in satisfactory strength and improved ductility properties at high temperature, other advantages being as follows:

(a) The high purity of the sintered products reduces surface defects and places at which breakage starts on the inside and outside of the finished products;

(b) Generally improved resistance to corrosion;

(c) The production is possible of more complicated shapes (for instance, cans with helical inside and outside fins);

(d) Little variation of the mechanical characteristics of the products, due to the high purity of the material, and above all to the high level of controlled oxidation.

A non-limitative example will now be given of the application of the process according to the invention to the manufacture of extruded blanks.

EXAMPLE 20 kg. of an Al-Mg alloy (2% Mg by weight), the starting aluminium having a purity of 99.99% ("Raffinal," trademark) was introduced into a melting furnace with an atomiser mounted ahead of a collecting and filtering chamber.

Atomisation was performed at 700° C., an analysis of the powder obtained giving the following result:

| | Percent by weight |
|---|---|
| Fe | 0.005 |
| Si | 0.003 |
| Mg total | 2.00 |

Controlled oxidation by grinding in the preesnce of silicone grease 3 kg. of the powder at a time, with the addition of 0.3% of silicone grease, was introduced into a horizontal rotary mill made of a light Al-Mg alloy and having grinding agents (balls) made of the same alloy, the powder being ground at ambient temperature and in continuously renewed air for a total of 70 hours. The temperature was kept constant at about the ambient value by spraying water over the outside of the mill.

RESULTS

| | Percent |
|---|---|
| $Al_2O_3$ content | ≈5.0 |
| MgO content | ≈1.0 |
| Total Mg content | ≈2.0 |
| Fe content | 0.005 |

(Yield of the test=95%)

Sintering

The oxidised powder, having the above contents, was compressed at a pressure of 2 t./cm.$^2$, to ingots each weighing 2 kg. and being 80 mm. in diameter. The ingots were then placed in a vacuum furnace for transformation and stabilisation of the mixed oxides of $Al_2O_3$+MgO and for degasification at a temperature of 600° C. for 22 hours at a residual pressure of $10^{-4}$–$10^{-5}$ mm. Hg, and then given a hot compressing at a temperature of 600° C. and a pressure of 5 t./cm.$^2$, whereafter, following the normal operations of turning and descaling, the ingots were extruded from a diameter of 80 mm. to a diameter of 16 mm. (extrusion ratio: 25) by a 500-ton horizontal press at an extrusion temperature of about 575° C. and at an extrusion speed of about 9 m. per minute.

Chemical analysis of the finished product gave the following results:

$Al_2O_3$=4.0%
MgO=2.0%
Mg (total)≈2.0%
Mg (unoxidised)≈0.2%
Fe=0.005%
Si=0.20% (originating from the silicone)
C=0.05% (originating from the silicone)
$H_2$=3 p.p.m.

Metallographic analysis of the finished product confirmed that the double oxide $Al_2O_3$+MgO was finely and homogeneously distributed in the martix of Al-Mg alloy.

A rapid tensile test on extruded specimens gave the results illustrated in the following table:

| Temperature (° C.) | Ultimate tensile strength, R (kg./mm.$^2$) | Yield strength, S 0.2% (kg./mm.$^2$) | Ultimate elongation, 5 φ A5 (percent) |
|---|---|---|---|
| 20 | 22 | 15 | 18.5 |
| 450 | 4 | 3.7 | 30 |

A tensile strength performed in similar conditions on extruded specimens of the material Al-$Al_2O_3$ (SAP type) containing a percentage of 4% $Al_2O_3$, obtained not with silicone grease, but by the method disclosed in Italian Pat. 665,875, gave the following results:

| Temperature (° C.) | R (kg./mm.$^2$) | S 0.2 (kg./mm.$^2$) | A5 (percent) |
|---|---|---|---|
| 20 | 22 | 14 | 20 |
| 450 | 6 | 5 | 8 |

A tensile stress performed in similar conditions on extruded specimens of the material Al-$Al_2O_3$ ("Puroxal" type) containing a percentage of 4% $Al_2O_3$ and obtained with silicone grease gave the following results:

| Temperature (° C.) | R (kg./mm.$^2$) | S 0.2 (kg./mm.$^2$) | A5 (percent) |
|---|---|---|---|
| 20 | 17 | 13 | 25 |
| 450 | 5 | 4 | 20 |

When these results are compared with those in the first table, it can be seen that the ductility characteristics of the material according to the present invention are considerably improved.

Creep tests at 450° C., performed with machines at a constant load, gave for the three materials defined hereinbefore the results shown in the following tables respectively: For the material according the present invention Al-Mg-$Al_2O_3$-MgO (≈4% $Al_2O_3$+3≈2% MgO)

| Temperature | Stressing (kg./mm.$^2$) | Breakage time, hours | Ultimate elongation, percent |
|---|---|---|---|
| 450° C. | 3 | 1 | 9 |
| | 2.75 | 50 | 5 |
| | 2.5 | 500 | 0.50 |
| | 2.25 | 1,000 | (0.30) |

For SAP (4% $Al_2O_3$)

| | | | |
|---|---|---|---|
| 450° C. | 4.25 | 1 | 0.50 |
| | 4 | 10 | 0.60 |
| | 3.75 | 100 | 0.25 |
| | 3.5 | 1,000 | 0.20 |

For PUROXAL (4% $Al_2O_3$)

| | | | |
|---|---|---|---|
| 450° C. | 3 | 1 | 0.80 |
| | 2.75 | 10 | 0.50 |
| | 2.5 | 100 | 0.30 |
| | 2.25 | 500 | 0.35 |
| | 2.00 | 1,000 | 0.20 |

A comparison of these creep results shows that the satisfactory strength properties of the material according to the present invention are preserved during prolonged hot tests, and more particularly the ductility properties are considerably improved under the same conditions (cf. the results underlined).

What is claimed is:

1. A process for the production of a composite material Al-Mg-$Al_2O_3$-MgO which comprises the steps of producing an Al-Mg alloy powder by pulverisation or atomisation from the molten state by a gun of a wire of the alloy, the powder being collected in a chamber or other collecting means made of aluminium or an alloy thereof, effecting a controlled oxidation of a fraction of given grain size of the powder by grinding in air at about ambient temperature, using a mill of which the operative members are of aluminium or an alloy thereof, and using as a grinding agent a material selected from the group consisting of stearic acid, a stearate and a silicone, effecting a cold compression of the ground powder, effecting a transformation of the $Al_2O_3$ and Mg of the matrix to form a double oxide $Al_2O_3$-MgO product, sintering and degasifying the product by heating in vacuo, effecting a hot compression of the product and then extruding the product.

2. A metallurgical process for obtaining sintered tubular Al-Mg-$Al_2O_3$-MgO products for nuclear applications, such as nuclear fuel element cans or nuclear reactor pressure tubes, having a controlled $Al_2O_3$ content, lying between 2 and 20% by weight, and a controlled MgO content, lying between 1 and 10% by weight, said process comprising: producing an Al-Mg (2–5% Mg by weight) (preferably 99.99% super-purity Al or 99.9% pure aluminium) alloy powder by atomization or pulverisation from the molten state by a gun from a wire of the alloy, said powder having any impurity present in a quantity lower than 0.1% by weight, said powder being collected in a collecting means made of aluminium and its alloys and selected from a group consisting of sedimentation or filtering chambers and cyclones; effecting a controlled oxidation of said powder by grinding said powder in air at ambient temperature using a mill having grinding containers and grinding agents made of aluminium alloy (for instance, Al-Mg), until the required $Al_2O_3$ content of between 2 and 20% is obtained, the grinding agent being selected from a group consisting of stearic acid, a stearate and, preferably, a silicone; cold compressing said powder having the required oxide content, preferably performed at a pressure of the order of 2 t./cm.$^2$; effecting a transformation of the $Al_2O_3$ and Mg of the matrix to form a double oxide $Al_2O_3$-MgO product; sintering and hot degasifying the product at a temperature of 550–625° C. in a furnace in vacuo at a residual pressure of $10^{-2}$–$10^{-5}$ mm. Hg for a period of about 10–30 hours, preferably 20–24 hours; hot compressing the sintered product, preferably performed at a temperature of 600° C. and a pressure of the order of 5 t./cm.$^2$ extruding the sintered product; and drawing the extruded product.

References Cited

UNITED STATES PATENTS

| | | | |
|---|---|---|---|
| 2,630,623 | 3/1953 | Chisholm et al. | 29—420 |
| 3,139,682 | 7/1964 | Grant | 75—206 X |
| 3,175,279 | 3/1965 | Scruggs | 75—206 X |
| 3,177,573 | 4/1965 | Foerster | 29—420 |
| 3,379,523 | 4/1968 | Chaklader | 75—206 |
| 3,394,000 | 7/1968 | Gaulandi et al. | 75—206 |

FOREIGN PATENTS

| | | | |
|---|---|---|---|
| 560,264 | 7/1958 | Canada | 29—420.5 |
| 647,968 | 11/1964 | Belgium | 75—206 |

JOHN F. CAMPBELL, Primary Examiner

D. C. REILEY, Assistant Examiner

U.S. Cl. X.R.

75—206